Patented Nov. 15, 1949

2,487,964

UNITED STATES PATENT OFFICE 2,487,964

METHOD OF EXTINGUISHING BURNING FLAMMABLE VAPORS

Robert A. Cranston, Cranston, R. I., assignor to Grinnell Corporation, Providence, R. I., a corporation of Delaware No Drawing. Application May 21, 1945, Serial No. 595,079

7 Claims. (Cl. 169—1)

This invention relates to an improved method of extinguishing burning flammable vapors.

So-called flammable liquids, such as various commercial oils, gasolene and the like, hereinafter referred to as oils, do not burn while in the liquid state. At the surface of such oils during combustion there is a more or less rapid process of vaporization occurring, and this produces and maintains a sort of zone or layer of what might be called undiluted vapor just above the liquid surface. This vapor by itself will also not burn but if it promptly diffuses into air which contains oxygen there is rapidly produced a flammable mixture which, if ignited, will burn.

A method of extinguishing fires of so-called flammable liquids, which has proven effective, is that disclosed in the Barclay patent, No. 2,008,847, of July 23, 1935. That method consists in forming at the surface of the oil an oil-in-water emulsion. If substantially the entire surface is so emulsified, that is, if the droplets of oil at the surface are surrounded by water, the emulsion is non-combustible and the fire will be extinguished.

The object of the present invention is directed to a different method of putting out such fires and in its essence effects the dilution of the flammable vapor by adding thereto a sufficient quantity of a non-flammable vapor which will not support combustion so that the resulting mixture is too lean to burn regardless of the presence of oxygen. A simple and convenient way to add such a vapor is to project into the oil a non-flammable liquid which is immiscible therewith but capable of forming with the oil an emulsion, preferably one in which the oil is in the continuous phase. The formation of the emulsion retains at the surface of the oil sufficient particles of the non-flammable liquid in the dispersed phase so that upon the oil film of the emulsion being vaporized by the heat of the combustion, the particles of non-flammable liquid will be exposed to this heat and be vaporized thereby to provide the desired non-flammable and non-combustion-supporting vapor. This when mixed with the flammable vapor rapidly dilutes the latter and promptly produces an unburnable mixture.

I have discovered that water is a suitable liquid for use in the practice of my improved method. It is immiscible with the oils hereinbefore mentioned and its vapor is non-flammable and will not support combustion. To produce the desired water-in-oil emulsion, water under pressures ranging from 20 pounds upward is projected onto the surface of the burning oil by means of a fixed nozzle located above the oil at a distance determined by the style of nozzle and the available water pressure, or by means of a portable nozzle attached to a hose. Whatever form of nozzle is used it should produce a discharge in the form of spray with particles large enough and moving at sufficient speed to penetrate the zone of burning vapors, reach the oil surface and there produce a water-in-oil emulsion which dwells temporarily at the surface of the liquid. That is, the water will be in the internal or dispersed phase and the oil will be in the external or continuous phase of the emulsion.

Such a water-in-oil emulsion would seem to provide no better protection against fire than if no emulsion were present and indeed the water-in-liquid emulsion is combustible in the sense that the external oil film will readily vaporize and its vapor will burn if the requisite amount of oxygen is present to support combustion. But the vaporizing of the external film of the emulsion frees the water particles and does so near the region of combustion. The heat of the latter rapidly vaporizes the water and the resulting water vapor rapidly mixes with the flammable (but not burning) vapor in the zone or space between the liquid surface and the place where the combustion is taking place. This mixing rapidly and extensively dilutes the flammable vapor to a degree that even when further mixed with oxygen the ultimate mixture will not burn and as a result the fire will be extinguished promptly.

Since the diluting water vapor is for the most part supplied by the water particles from the water-in-oil emulsion it is important that the emulsion be quickly formed and maintained until the fire is extinguished. To this end the improved method embraces the dispersion of suitable oil-soluble emulsifying agents in the water if the oil does not contain such agents which cause the water-in-oil emulsion to be readily formed. Most emulsifying agents are predominately soluble in one or the other of the emulsion components or phases and, in general, the phase in which the agent is more soluble will become the continuous phase. Preferably in the practice of my invention the emulsifying agent used should be one predominately soluble in the oil and only slightly soluble, if at all, in the water. For example, sorbitan mono-laurate, mannitan oleate, sorbitan triricinoleate and poly ether of mannitan palmitate are satisfactory emulsifying agents. Thus when such an agent is introduced into the water, its oil-soluble portion, so to speak, will become dispersed therein and be ready to dissolve in the oil when the latter is encountered. This will tend greatly to insure the formation of the desired water-in-oil emulsion, effect the dilution of the flammable vapor and bring about the extinguishing of the fire.

I claim:

1. The method of extinguishing a burning vapor originating from the flammable vapor of an oil immiscible with water and capable of forming therewith a water-in-oil emulsion, which method consists in dispersing an oil-soluble emulsifying agent in water, projecting finely divided particles of the said water and dispersed agent onto the surface of the oil to form thereat a flammable emulsion in which the water is in the internal phase and the oil is in the external phase, vaporizing both constituents of the emulsion by the heat of combustion to produce water vapor, mixing said water vapor with the flammable vapor of the oil to dilute the latter and produce a mixture of vapors that will not burn.

2. The method of extinguishing a burning vapor originating from the flammable vapor of an oil immiscible with water and capable of forming therewith a water-in-oil emulsion, which method consists in adding sufficient water vapor to the flammable vapor of the oil to form a mixture of vapors which will not burn in the presence of atmospheric oxygen, the said addition being effected by dispersing in water an emulsifying agent predominately soluble in oil and slightly soluble in water and then projecting finely divided particles of said water and said dispersed emulsifying agent onto the surface of the oil so as to form thereat an emulsion composed of oil in the external phase and water in the internal phase, thereby causing the water to dwell at the surface of the oil so as to be vaporized by the heat of combustion and form the said mixture of vapors.

3. The method of extinguishing a burning vapor originating from the flammable vapor of an oil immiscible with water and capable of forming therewith a water-in-oil emulsion, which method consists in dispersing an emulsifying agent in water and projecting particles of water containing said dispersed emulsifying agent onto the oil to form at the surface thereof a water-in-oil emulsion, vaporizing said emulsion to provide water vapor, and mixing said water vapor with the flammable vapor of the oil to produce a non-flammable mixture of said vapors which will not burn.

4. The method of extinguishing a burning vapor originating from the flammable vapor of an oil immiscible with water and capable of forming therewith a water-in-oil emulsion, which method consists in projecting particles of water having dispersed therein an emulsifying agent that is predominately soluble in the oil onto the oil to form at the surface thereof a water-in-oil emulsion having a flammable external phase and an internal water phase, followed by the heat of combustion vaporizing the said flammable phase and the said water phase whereupon the water vapor mixes with and dilutes the flammable vapor to form a mixture of vapors too lean to burn regardless of the presence of atmospheric oxygen.

5. The method of extinguishing a burning vapor originating from the flammable vapor of an oil immiscible with water and capable of forming therewith a water-in-oil emulsion, which method consists in projecting particles of water containing an emulsifying agent onto the oil to form at the surface thereof a water-in-oil emulsion having a flammable external phase and having a water internal phase of such concentration that upon the heat of combustion vaporizing both said phases the resulting mixture of the flammable and water vapors will not burn.

6. The method of extinguishing a burning vapor originating from the flammable vapor of an oil immiscible with water and capable of forming therewith a water-in-oil emulsion, which method consists in dispersing an emulsifying agent in water and then projecting particles of water containing said dispersed emulsifying agent onto the surface of the oil to form thereat a self-extinguishing emulsion composed of a flammable external phase of oil and a non-flammable internal phase of water, followed by the heat of combustion vaporizing both said phases to produce water vapor, and mixing said water vapor with the flammable vapor to produce a non-flammable and extinguishing vapor mixture too lean to burn in the presence of atmospheric oxygen.

7. The method of extinguishing a burning vapor originating from the flammable vapor of an oil immiscible with water and capable of forming therewith a water-in-oil emulsion, which method consists in projecting particles of water containing an emulsifying agent which is predominately soluble in oil onto the oil to form at the surface thereof a water-in-oil emulsion having a flammable external phase and a water internal phase, followed by vaporizing both phases by the heat of combustion to produce water vapor, and mixing the flammable vapor of the oil and the water vapor to form a mixture thereof which will not burn.

ROBERT A. CRANSTON.

REFERENCES CITED

The following references are of record in the file of this patent:

UNITED STATES PATENTS

| Number | Name | Date |
| --- | --- | --- |
| 1,346,099 | Byrd | July 6, 1920 |
| 1,477,996 | Church | Dec. 18, 1923 |
| 2,008,847 | Barclay | July 23, 1935 |
| 2,028,091 | Jaeger | Jan. 14, 1936 |